US012097602B2

(12) United States Patent
Schreiber

(10) Patent No.: US 12,097,602 B2
(45) Date of Patent: Sep. 24, 2024

(54) HAND-HELD POWER TOOL AND PRODUCTION METHOD FOR A HAND-HELD POWER TOOL

(71) Applicant: Hilti Aktiengesellschaft, Schaan (LI)

(72) Inventor: Wolfgang Schreiber, Buchloe (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/035,310

(22) PCT Filed: Nov. 9, 2021

(86) PCT No.: PCT/EP2021/081059

§ 371 (c)(1),
(2) Date: May 4, 2023

(87) PCT Pub. No.: WO2022/111987

PCT Pub. Date: Jun. 2, 2022

(65) Prior Publication Data

US 2024/0001525 A1 Jan. 4, 2024

(30) Foreign Application Priority Data

Nov. 27, 2020 (EP) .................................... 20210377

(51) Int. Cl.
*B25F 5/02* (2006.01)
*B25D 11/12* (2006.01)
(Continued)

(52) U.S. Cl.
CPC .............. *B25F 5/02* (2013.01); *B25D 11/125* (2013.01); *B25D 16/00* (2013.01); *B25F 5/001* (2013.01);
(Continued)

(58) Field of Classification Search
CPC .......... B25F 5/02; B25F 5/001; B25D 11/125; B25D 16/00
See application file for complete search history.

(56) References Cited

U.S. PATENT DOCUMENTS

2006/0144604 A1* 7/2006 Soika ..................... B25D 16/00 173/109
2006/0156858 A1* 7/2006 Soika ..................... B25D 17/24 74/606 R

FOREIGN PATENT DOCUMENTS

DE 4004464 A1 1/1991
DE 102012212771 A1 1/2013
(Continued)

OTHER PUBLICATIONS

International Search Report of PCT/EP2021/081059 dated Feb. 18, 2022.

*Primary Examiner* — Nathaniel C Chukwurah
(74) *Attorney, Agent, or Firm* — Davidson Kappel LLC

(57) ABSTRACT

The hand-held power tool (1) includes a transmission housing (24) for receiving a transmission (23), a motor housing (25) for receiving a motor (5), a bearing plate (28) arranged between the transmission housing (24) and the motor housing (25) for mounting a shaft (21) of the motor (5), at least one first screw (32) which fastens the bearing plate (28) to the motor housing (25), wherein the first screw (32) is not in engagement with the transmission housing (24), and at least one second screw (33) which fastens the transmission housing (24) to the bearing plate (28), wherein the second screw (33) is not in engagement with the motor housing (25).

15 Claims, 5 Drawing Sheets

(51) Int. Cl.
*B25D 16/00* (2006.01)
*B25F 5/00* (2006.01)

(52) U.S. Cl.
CPC .. *B25D 2250/065* (2013.01); *B25D 2250/121* (2013.01); *B25D 2250/361* (2013.01)

(56) References Cited

FOREIGN PATENT DOCUMENTS

| | | | |
|---|---|---|---|
| DE | 202015000331 | U1 | 2/2015 |
| GB | 2493104 | B | 4/2016 |
| WO | WO 2011082849 | A2 | 7/2011 |

* cited by examiner

HAND-HELD POWER TOOL AND PRODUCTION METHOD FOR A HAND-HELD POWER TOOL

The present invention relates to a hand-held power tool and to a production method for a hand-held power tool.

BACKGROUND

Hand-held power tools, such as hammer drills, usually have a motor for driving a transmission or a drive unit. The transmission or the drive unit comprises, for example, a drive shaft and/or an impact mechanism. For example, the motor is used to drive a drive shaft to rotate about a working axis in order to rotate a tool of the hand-held power tool, such as a drill bit, along the working axis into a substrate by means of a rotary movement of a tool fitting coupled to the drive shaft.

SUMMARY OF THE INVENTION

The motor is accommodated, for example, in a separate motor housing to which a transmission housing is attached (e.g. via a bearing plate). It is known to attach a transmission housing to a bearing plate and a motor housing by means of four screws which are each guided through bores in the transmission housing and the bearing plate and are screwed into the motor housing. For this purpose, for fastening the screws, there needs to be enough space in the motor housing for corresponding counterparts of the screws. In the known hand-held power tool, the four screws are screwed into screw domes of the motor housing, which are arranged around the motor in the motor housing. The known motor housing has a relatively large outer circumference due to the arrangement of the four screw domes and is difficult to hold in the hand by a user.

Against this background, an object of the present invention is to create an improved hand-held power tool and an improved production method for a hand-held power tool.

The present invention provides a hand-held power tool which comprises a transmission housing for receiving a transmission and a motor housing for receiving a motor. In addition, the hand-held power tool comprises a bearing plate, which is arranged between the transmission housing and the motor housing, for mounting a shaft of the motor. In addition, the hand-held power tool comprises at least one first screw which fastens the bearing plate to the motor housing, wherein the first screw is not in engagement with the transmission housing, and at least one second screw which fastens the transmission housing to the bearing plate, wherein the second screw is not in engagement with the motor housing.

By virtue of the fact that the at least one second screw which fastens the transmission housing to the bearing plate is not in engagement with the motor housing, no space is required in the motor housing for the arrangement of a counterpart for the at least one second screw. For example, no space is required in the motor housing for the arrangement of one or more screw domes into which the at least one second screw can be screwed. The motor housing can thus be made slimmer and can be better held in the hand and guided by a user.

The hand-held power tool is, for example, a hammer drill or a rotary hammer. The motor is used, for example, to drive a drive shaft of the transmission (drive unit) in a rotating manner and/or to drive an impact mechanism. The drive shaft is coupled, for example, to a tool fitting of the hand-held power tool, so that a tool, for example a drill bit, accommodated in the tool fitting can be rotated about a working axis. Furthermore, in addition to the rotation about the working axis, the tool can be struck into a substrate in a striking direction along the working axis by means of the impact mechanism.

The transmission housing is made of metal, for example. The transmission of the hand-held power tool is accommodated in the transmission housing. The transmission of the hand-held power tool is a drive unit of the hand-held power tool, which comprises a drive shaft, an impact mechanism and other drive components such as an eccentric, a connecting rod and gearwheels. A tool fitting, for example, is fastened to the transmission housing.

The transmission housing can, for example, be accommodated in a plastic housing (plastic shell) in order to prevent a user from touching metal parts of the hand-held power tool for reasons of electrical safety.

The motor housing is made of plastic, for example. The motor housing is produced, for example, in a plastic injection-molding process.

The bearing plate is made of metal, for example. The bearing plate has, in particular, a central through-bore through which a shaft of the motor is guided. The bearing plate is used in particular to mount the motor shaft or a rotor (armature) of the motor. The bearing plate can, for example, form a (partial) covering of an opening in the motor housing.

The at least one first and at least one second screw is made of metal, for example. The at least one first screw has, in particular, a thread for engagement with the motor housing, in particular a screw counterpart of the motor housing (e.g. screw dome). The at least one second screw has, in particular, a thread for engagement with the bearing plate, in particular a screw counterpart of the bearing plate (for example thread of the bearing plate).

The at least one second screw does not, for example, protrude beyond the bearing plate in the direction of the motor housing or, in particular, does not extend into the motor housing. The at least one second screw is, for example, shorter than the at least one first screw.

According to one embodiment, the hand-held power tool comprises at least one third screw which fastens the transmission housing, the bearing plate and the motor housing to one another.

The transmission housing, the bearing plate and the motor housing can be fastened to one another even better by means of the at least one third screw.

The at least one third screw preferably penetrates through the transmission housing and the bearing plate and penetrates into the motor housing.

The at least one third screw is made of metal, for example. The at least one third screw has, in particular, a thread for engagement with the motor housing, in particular with a screw counterpart of the motor housing (e.g. screw dome).

According to a further embodiment, the motor housing has at least one dome for engagement of a thread of the at least one first screw and/or the at least one third screw.

The at least one first screw and/or the at least one third screw can be positioned and fastened more easily in the motor housing by the at least one dome of the motor housing. The at least one dome (screw dome) of the motor housing has, for example, a bore (pilot bore) and/or a protruding section. For example, a thread of the at least one first screw and/or of the at least one third screw can be tapped into the dome.

The at least one dome is, for example, formed in one piece with the motor housing. The at least one dome is produced, for example, together with the motor housing in an injection-molding process.

According to a further embodiment, the bearing plate has at least one bore for receiving the at least one dome of the motor housing.

By virtue of the fact that the bearing plate has the at least one bore, the bearing plate can be arranged on the motor housing prior to fastening with the at least one first screw and/or the at least one third screw by arranging the at least one dome of the motor housing in the at least one bore of the bearing plate. This allows the bearing plate to be better positioned on the motor housing.

The at least one bore in the bearing plate has, for example, a through-bore, a pocket and/or a blind hole.

According to a further embodiment, the at least one first screw and/or the at least one third screw is a self-tapping screw.

As a result, a thread of the at least one first screw and/or of the at least one third screw can be screwed, in particular imprinted, directly into a material of the motor housing in a self-tapping manner. In particular, the screw counterpart of the at least one first screw and/or of the at least one third screw can be designed without a thread.

The at least one first screw and/or the at least one third screw is, for example, a Remform screw.

According to a further embodiment, the bearing plate has at least one threaded bore for screwing in the at least one second screw.

This achieves stable fastening of the at least one second screw on the bearing plate. In particular, a thread of the at least one second screw is brought into engagement with a mating thread of the threaded bore of the bearing plate.

According to a further embodiment, the bearing plate has at least one dome for receiving the at least one second screw.

By means of the at least one dome of the bearing plate, the transmission housing can be arranged on the bearing plate in such a way that at least one bore in the transmission housing receives the at least one dome of the bearing plate. The at least one bore in the transmission housing is, for example, a threadless through-bore. As a result, the transmission housing can be better positioned on the bearing plate before the at least one second screw is fastened.

The at least one dome of the bearing plate has, in particular, a projection for insertion into the at least one bore of the transmission housing.

The at least one dome of the bearing plate has in particular the threaded bore for screwing in the at least one second screw.

According to a further embodiment, the hand-held power tool has the motor with the shaft and the transmission with a drive shaft. Furthermore, an axis of rotation of the motor shaft encloses an angle with an axis of rotation of the drive shaft.

As a result, the motor housing can be made slimmer at a point which is usually held by hand by a user.

In particular, the axis of rotation of the motor shaft and the axis of rotation of the drive shaft are arranged at an angle to one another. In particular, the axis of rotation of the motor shaft and the axis of rotation of the drive shaft are not parallel to one another.

For example, the axis of rotation of the motor shaft encloses an angle between 60° and 120°, in particular an angle of 90°, with the axis of rotation of the drive shaft.

According to a further embodiment, at least one first screw is arranged on a plane of symmetry of the hand-held power tool that runs through the axis of rotation of the drive shaft and the axis of rotation of the motor shaft.

As a result of this central arrangement of the at least one first screw, the motor housing can be made even slimmer and can be even better held by hand and guided by a user.

According to a further aspect, the present invention provides a method for producing a hand-held power tool. The hand-held power tool has a transmission housing for receiving a transmission, a motor housing for receiving a motor, a bearing plate for mounting a shaft of the motor and at least one first and one second screw. The method has the following steps of:

fastening the bearing plate to the motor housing with the at least one first screw, providing the transmission housing, and fastening the transmission housing to the bearing plate with the at least one second screw, wherein the second screw is not in engagement with the motor housing.

According to one embodiment of the further aspect, the method has a step of fastening the transmission housing, the bearing plate and the motor housing to one another with at least one third screw.

The fastening step by means of the at least one third screw is carried out in particular after the fastening step by means of the at least one first screw. Furthermore, the fastening step by means of the at least one third screw can be carried out, for example, before or after the fastening step by means of the at least one second screw.

According to a further embodiment of the further aspect, when fastening the bearing plate to the motor housing with the at least one first screw and/or when fastening the transmission housing, the bearing plate and the motor housing to one another with the at least one third screw, at least one dome of the motor housing is introduced into at least one bore in the bearing plate.

In particular, the at least one dome of the motor housing serves as a screw counterpart for the at least one first screw and/or the at least one third screw.

According to a further embodiment of the further aspect, the at least one first screw and/or the at least one third screw is screwed into the motor housing in a self-tapping manner.

In particular, the at least one first screw and/or the at least one third screw is screwed into the at least one dome of the motor housing in a self-tapping manner.

According to a further embodiment of the further aspect, when fastening the transmission housing to the bearing plate with the at least one second screw, at least one dome of the bearing plate is introduced into a bore in the transmission housing.

According to a further embodiment of the further aspect, when fastening the transmission housing to the bearing plate with the at least one second screw, the at least one second screw is screwed into a threaded bore of the bearing plate.

BRIEF DESCRIPTION OF THE DRAWINGS

The following description explains the invention with reference to exemplary embodiments and figures, in which.

Identical or functionally identical elements are indicated by identical reference signs in the figures, unless stated otherwise.

DETAILED DESCRIPTION

Figure 1:
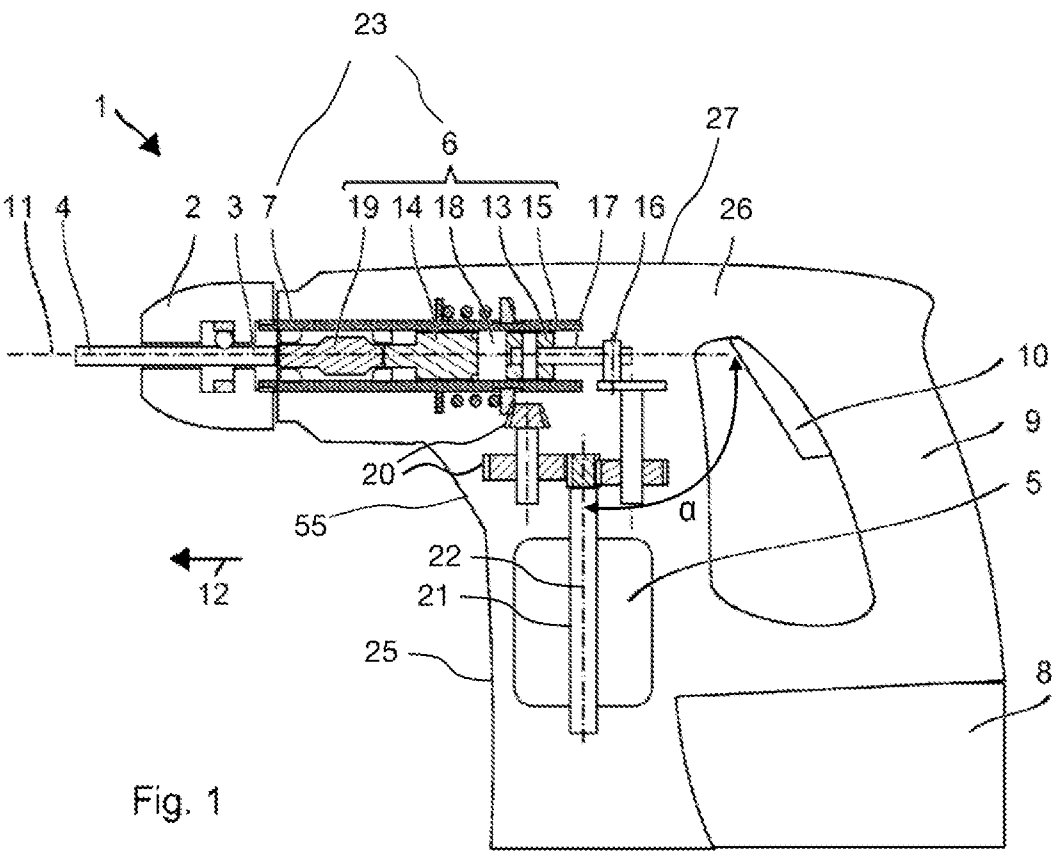
FIG. 1 shows a schematic view of a hammer drill.

FIG. 1 schematically shows a hammer drill 1 as an example of a hand-held power tool. The hammer drill 1 has a tool fitting 2, into which a shaft end 3 of a tool, for example of a drill bit 4, can be inserted. A motor 5, which drives an impact mechanism 6 and a drive shaft 7, forms a primary drive of the hammer drill 1. A battery 8 or a power cord supplies the motor 5 with power. A user can hold and guide the hammer drill 1 by means of a handle 9. Furthermore, the user can put the hammer drill 1 into operation by means of a main switch 10. As a result of the main switch 10 being actuated, the drive shaft 7 coupled to the tool fitting 2 sets the tool fitting 2 into rotation about a working axis 11. As a result, the tool 4 is rotated about the working axis 11. During operation, in addition to the rotation about the working axis 11, the hammer drill 1 can strike the tool 4 into a substrate in a striking direction 12 along the working axis 11. In one exemplary embodiment, the hammer drill 1 has a mode selector switch, by way of which the tool fitting 2 can be uncoupled from the drive shaft 7 such that a purely striking mode of the hammer drill 1 is possible.

The impact mechanism 6 is a pneumatic impact mechanism. An exciter piston 13 and an impact piston 14 are guided in movement along the working axis 11 in a guide tube 15 in the impact mechanism 6. The exciter piston 13 is coupled to the motor 5 via an eccentric 16 and forced to carry out a periodic, linear movement. A connecting rod 17 connects the eccentric 16 to the exciter piston 13. A pneumatic spring 18 formed by a pneumatic chamber between the exciter piston 13 and the impact piston 14 couples a movement of the impact piston 14 to the movement of the exciter piston 13. The impact piston 14 strikes an anvil 19, which transfers the impact to the drill bit 4.

The drive shaft 7 connected to the tool fitting 2 is coupled to the motor 5, in particular to a shaft 21 of the motor 5, via gearwheels 20.

In the example shown in FIG. 1, the shaft 21 driven by the motor 5 is arranged at a right angle α to the drive shaft 7. In particular, an axis of rotation 22 of the motor shaft 21 is arranged at a right angle α to the working axis 11, which corresponds to the axis of rotation of the drive shaft 7.

Figure 2:
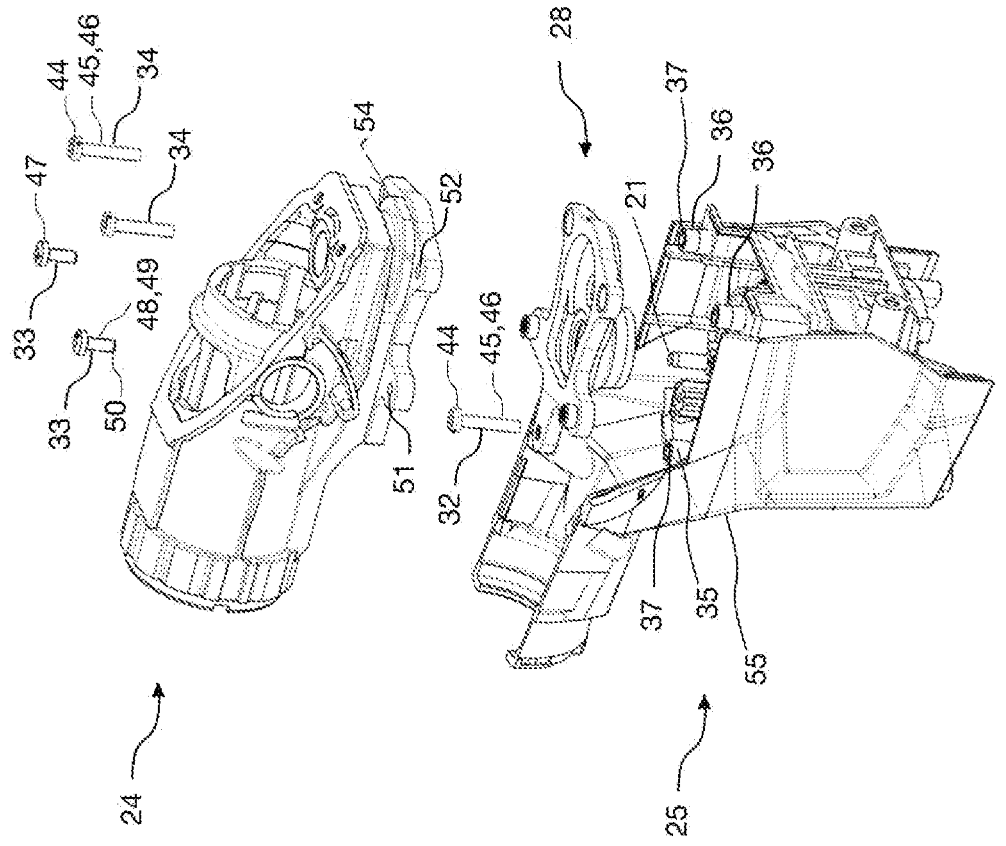
FIG. 2 shows a schematic exploded view of a transmission housing, a bearing plate and a motor housing of the hammer drill from FIG. 1.

The drive shaft 7, the impact mechanism 6 and further drive components, such as the eccentric 16, the connecting rod 17 and the gearwheels 20, are part of a transmission 23 (drive unit) of the hammer drill 1. The transmission 23 is received in a transmission housing 24 (FIG. 2). The transmission housing 24 is in particular made of metal.

The motor 5 is accommodated in a motor housing 25 which is open at the top (FIG. 2). The motor housing 25 is made of plastic. It is manufactured in an injection-molding process, for example.

The motor housing 25 forms part of an outer housing 26 (FIG. 1) of the hammer drill 1. In addition to the motor housing 25, the outer housing 26 of the hammer drill 1 also comprises a plastic shell 27 (FIG. 1) which surrounds the metallic transmission housing 24 (FIG. 2). The outer housing 26 can also comprise further elements, such as the handle 9, for example.

As shown in FIG. 2, the hammer drill 1 also comprises a bearing plate 28 for mounting the shaft 21 of the motor 5 (or a rotor of the motor 5). The bearing plate 28 is arranged between the transmission housing 24 and the motor housing 25.

Figure 3:
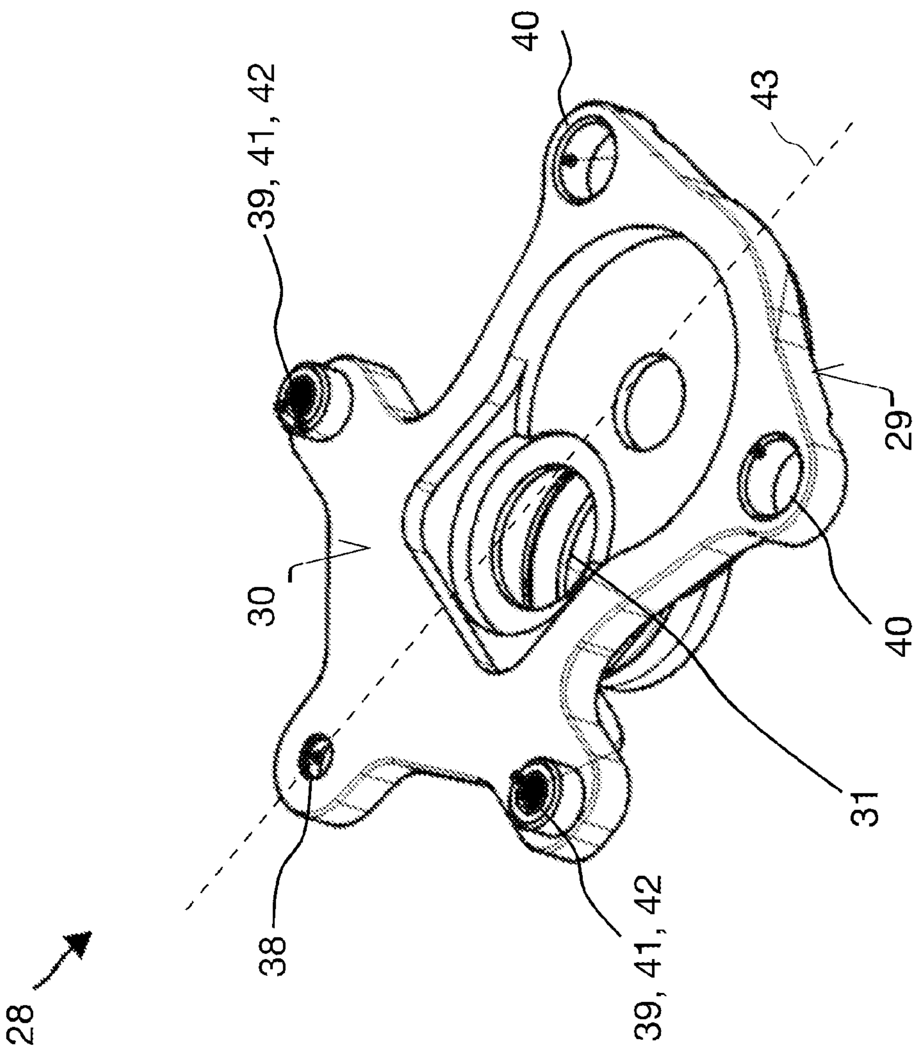
FIG. 3 shows a detail view of the bearing plate from FIG. 2.

FIG. 3 shows an enlarged view of the bearing plate 28. The bearing plate 28 has a lower side 29 facing the motor housing 25 in the assembled state of the hammer drill 1 and an upper side 30 facing the transmission housing 24. In addition, the bearing plate 28 has a central through-bore 31 through which the shaft 21 (FIGS. 1 and 2) of the motor 5 is guided.

The bearing plate 28 is fastened to the motor housing 25 with at least one first screw 32 (FIG. 2). In the example of FIG. 2, the bearing plate 28 is fastened to the motor housing 25 with precisely one first screw 32.

The transmission housing 24 is fastened to the bearing plate 28 with at least one second screw 33. In the example of FIG. 2, the transmission housing 24 is fastened to the bearing 28 with two second screws 33.

In addition, the transmission housing 24, the bearing plate 28 and the motor housing 25 are fastened to one another with at least one third screw 34 (two third screws 34 in the example of FIG. 2).

To fasten the first screw 32 and the two third screws 34 to the motor housing 25, the motor housing 25 has three domes (screw domes) 35, 36. The three domes 35, 36 are, for example, manufactured integrally with the motor housing 25 in an injection-molding process. Each of the three domes 35, 36 has an upwardly open pilot bore 37 (blind hole). The pilot bores 37 of the domes 35, 36 of the motor housing 25 are used for better insertion of the first screw 32 and the third screws 34.

To attach the bearing plate 28 to the motor housing 25 and to the transmission housing 24, the bearing plate 28 has a first bore 38, two second bores 39 and two third bores 40 (FIG. 3).

The first bore 38 of the bearing plate 28 is threadless and serves to receive the dome 35 of the motor housing 25 and to fasten the first screw 32.

The second bores 39 of the bearing plate 28 each have a thread 41 and are used to fasten the second screws 33. In addition, the second bores 39 have domes 42 protruding from the upper side 30 of the bearing plate 28 for positioning the transmission housing 24.

The third bores 40 are threadless and serve to receive the domes 36 of the motor housing 25 and to fasten the third screws 34.

In the example shown, all of the bores 38, 39, 40 of the bearing plate 28 are through-bores which go through from the lower side 29 to the upper side 30 of the bearing plate 28. In other examples, the second bores 39 can also be blind holes which are open to the upper side 30 of the bearing plate 28 facing the transmission housing 24 and are closed to the lower side 29 of the bearing plate 28 facing the motor housing 25.

The first bore 38 is arranged centrally on the bearing plate 28, that is to say on an axis of symmetry 43 of the bearing plate 28. The axis of symmetry 43 of the bearing plate 28 is parallel to the working axis 11 in the assembled state of the hammer drill 1. The two second bores 39 and the two third bores 40 are each arranged laterally from the axis of symmetry 43 and symmetrically to the axis of symmetry 43.

Each of the first and third screws 32, 34 has a screw head 44 and a shaft 45 with a thread 46. The first screw 32 and the third screws 34 are in particular self-tapping screws which, by means of their thread 46, can be tapped/imprinted into the plastic material of the motor housing 25, in particular the domes 35, 36 of the motor housing 25. The first screw 32 and the third screw 34 are, for example, REMFORM® screws.

Each of the second screws 33 has a screw head 47 and a shaft 48 with a thread 49. The second screws 33 are screwed into the threaded bores 39 of the bearing plate 28, so that the thread 49 of the screws 33 comes into engagement with the mating thread 41 of the bearing plate 28. The screws 33 are, for example, metric screws. The shaft 48 of the screws 33 is in particular shorter than the shaft 45 of the screws 32, 34. This ensures that a lower end 50 (FIG. 2) of the screws 33 does not protrude from the lower side 29 (FIG. 3) of the bearing plate 28. For example, the lower end 50 of the screws 33 is flush with the lower side 29 of the bearing plate 28.

Figure 4:
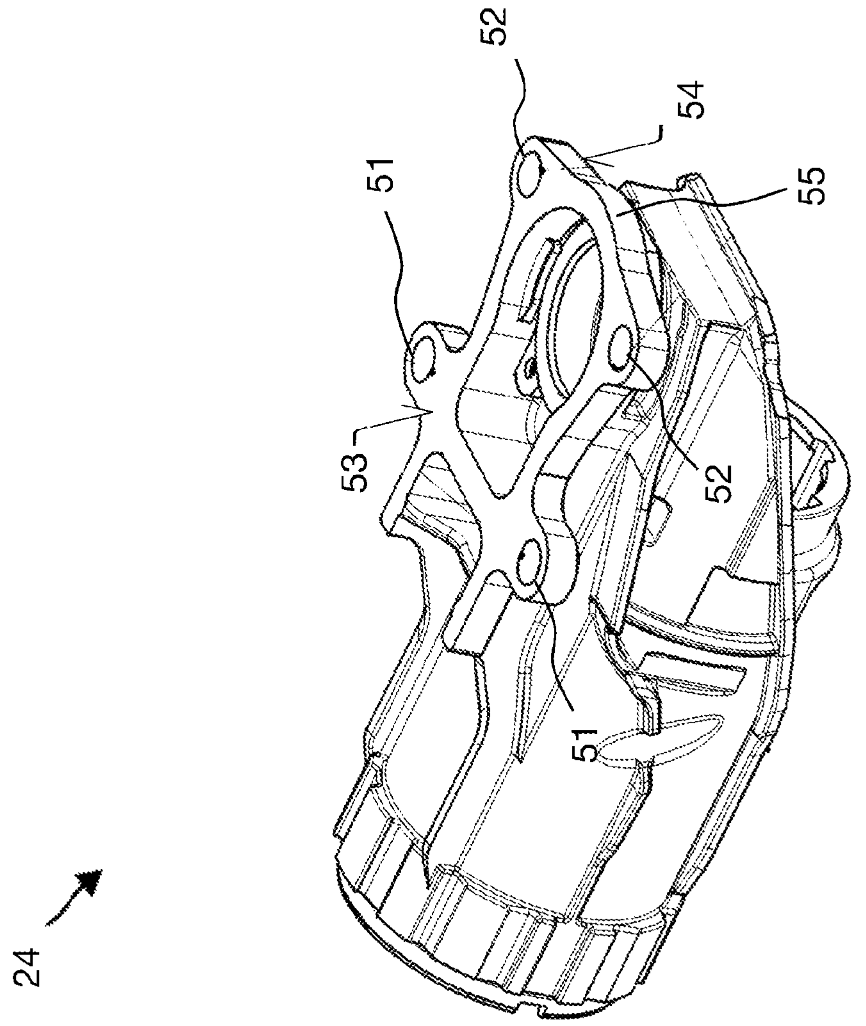
FIG. 4 shows a detail view of the transmission housing from FIG. 2.

To attach the transmission housing 24 to the bearing plate 28 by means of the second screws 33 and to the motor housing 25 by means of the third screws 34, the transmission housing 24 has four through-bores 51, 52 (FIG. 2). FIG. 4 shows the transmission housing 24 from below, that is to say from a side 53 of the transmission housing 24 facing the bearing plate 28. The through-bores 51, 52 extend from the side 53 of the transmission housing 24 to a side 54 of the transmission housing 24 opposite the side 53. The two sides 53 and 54 of the transmission housing 24 are in particular sides of a mounting flange 55 of the transmission housing 24.

In the assembled state of the transmission housing 24, the bearing plate 28 and the motor housing 25, the bearing plate 28 is arranged on the motor housing 25 in such a way that the dome 35 of the motor housing 25 is inserted into the through-bore 38 of the bearing plate 28 and the domes 36 of the motor housing 25 are inserted into the through-bores 40 of the bearing plate 28. In addition, the self-tapping first screw 32 is tapped into the dome 35 of the motor housing 25 received in the bore 38 of the bearing plate 28. The first screw 32 thus connects the bearing plate 28 to the motor housing 25. In particular, the screw head 44 engages behind the upper side 30 (FIG. 3) of the bearing plate 28. The first screw 32 is in particular not in engagement with the transmission housing 24.

Furthermore, in the assembled state of the transmission housing 24, the bearing plate 28 and the motor housing 25, the self-tapping third screws 34 are guided through the bores 52 of the transmission housing 24 and tapped into the domes 36 of the motor housing 25 received in the third bores 40 of the bearing plate 28. The third screws 34 thus connect the transmission housing 24, the bearing plate 28 and the motor housing 25. The screw head 44 of the third screws 34 engages in particular behind the upper side 54 (FIG. 2) of the transmission housing 24.

In addition, in the assembled state of the transmission housing 24, the bearing plate 28 and the motor housing 25, the domes 39 of the bearing plate 28 are inserted into the bores 51 of the transmission housing 24 and the second screws 33 (thread 49) are screwed into the mating thread 41 of the domes 39 of the bearing plate 28. The second screws 33 thus connect the transmission housing 24 to the bearing plate 28. The screw head 47 of the second screws 33 engages in particular behind the upper side 54 (FIG. 2) of the transmission housing 24. The lower end 50 of the screws 33, which is opposite the screw head 47, does not protrude from the bottom of the bearing plate 28.

Since the second screws 33 are anchored in the bearing plate 28 and not in the motor housing 25, no screw counterparts, such as domes similar to the domes 35, 36, are required for the second screws 33 in the motor housing 25. In this way, space can be saved in a front region 55 (FIGS.

1 and 2) of the motor housing 25. Thus, the front region 55 of the motor housing 25 can be made slimmer. Thus, the hammer drill 1 can be better held and guided by a user who holds the hammer drill 1 with one hand on the handle 9 (FIG. 1) and with the other hand on the front region 55 of the motor housing 25.

Figure 5:
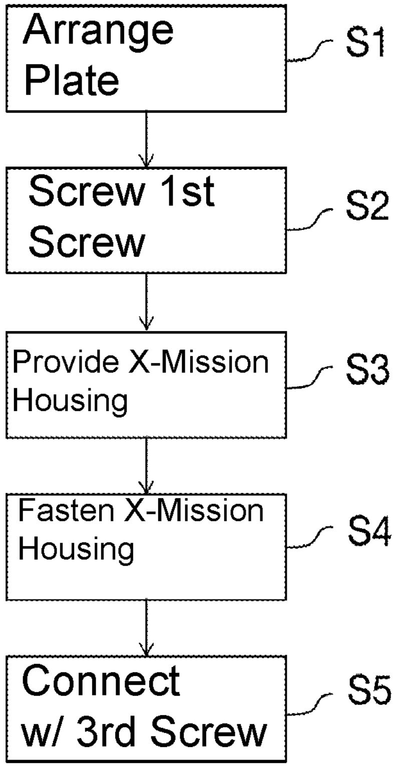
FIG. 5 shows a flow diagram of a method for producing the hammer drill from FIG. 1.

A method for producing the hand-held power tool 1 (the hammer drill 1) is described below with reference to FIG. 5. In particular, the method is used to fasten the transmission housing 24, the bearing plate 28 and the motor housing 25 to one another.

In a first step S1 of the method, the bearing plate 28 is arranged on the motor housing 25 in such a way that the domes 35, 36 of the motor housing 25 are inserted into the bores 38, 40 of the bearing plate 28.

In a second step S2 of the method, the bearing plate 28 is screwed to the motor housing 25 by means of the first screw 32. Here, the first screw 32 is screwed in a self-tapping manner into the dome 35 of the motor housing 25 received in the bore 38 of the bearing plate 28.

In a third step S3 of the method, the transmission housing 24 is provided.

In a fourth step S4 of the method, the transmission housing 24 is fastened to the bearing plate 28 by means of the two second screws 33. First, the two domes 42 of the bearing plate 28 are here introduced into the bores 51 of the transmission housing 24. Then the two second screws 33 are screwed into the threaded bores 39 of the bearing plate 28. The second screws connect, in particular, the transmission housing 24 and the bearing plate 28 without, however, coming into engagement with the motor housing 25.

In a fifth step S5 of the method, the transmission housing 24, the bearing plate 28 and the motor housing 25 are connected to one another by means of the two third screws 34. Here, the third screws 34 are screwed in a self-tapping manner into the domes 36 of the motor housing 25 received in the bores 40 of the bearing plate 28.

The screwing of the second screws 33 into the threaded bores 39 of the bearing plate 28 in step S4 can also be carried out after step S5.

LIST OF REFERENCE SIGNS

1 Hand-held power tool
2 Tool fitting
3 Shaft end
4 Tool
5 Motor
6 Impact mechanism
7 Drive shaft
8 Battery
9 Handle
10 Main switch
11 Working axis
12 Striking direction
13 Exciter piston
14 Impact piston
15 Guide tube
16 Eccentric
17 Connecting rod
18 Pneumatic spring
19 Anvil
20 Gearwheel
21 Motor shaft
22 Axis of rotation
23 Transmission (drive unit)
24 Transmission housing

25 Motor housing
26 Outer Housing
27 Shell
28 Bearing plate
29 Lower side
30 Upper side
31 Through-bore
32 First screw
33 Second screw
34 Third screw
35 Dome
36 Dome
37 Pilot bore
38 First bore
39 Second bore
40 Third bore
41 Thread
42 Dome
43 Axis of symmetry
44 Screw head
45 Shaft
46 Thread
47 Screw head
48 Shaft
49 Thread
50 End
51 Through-bore
52 Through-bore
53 Side
54 Side
55 Mounting flange
α Angle
S1-S5 Method steps

What is claimed is:

1. A hand-held power tool comprising:

a transmission housing for receiving a transmission;

a motor housing for receiving a motor;

a bearing plate arranged between the transmission housing and the motor housing for mounting a shaft of the motor;

at least one first screw fastening the bearing plate to the motor housing, the first screw not being in engagement with the transmission housing; and at least one second screw fastening the transmission housing to the bearing plate, the second screw not being in engagement with the motor housing.

2. The hand-held power tool as recited in claim 1 further comprising at least one third screw fastening the transmission housing, the bearing plate and the motor housing to one another.

3. The hand-held power tool as recited in claim 1 wherein the motor housing has at least one dome for engagement of a thread of the at least one first screw or of at least one third screw.

4. The hand-held power tool as recited in claim 3 wherein the bearing plate has at least one bore for receiving the at least one dome of the motor housing.

5. The hand-held power tool as recited in claim 1 wherein the at least one first screw or at least one third screw is a self-tapping screw.

6. The hand-held power tool as recited in claim 1 wherein the bearing plate has at least one threaded bore for screwing in the at least one second screw.

7. The hand-held power tool as recited in claim 1 wherein the bearing plate has at least one dome for receiving the at least one second screw.

8. The hand-held power tool as recited in claim 1 wherein an axis of rotation of the motor shaft encloses an angle with an axis of rotation of the drive shaft.

9. The hand-held power tool as recited in claim 8 wherein the at least one first screw is arranged on a plane of symmetry of the hand-held power tool running through the axis of rotation of the drive shaft and the axis of rotation of the motor shaft.

10. A method for producing a hand-held power tool having a transmission housing for receiving a transmission, a motor housing for receiving a motor, a bearing plate (28) for mounting a shaft of the motor and at least one first and one second screw, the method comprising the steps of:

fastening the bearing plate to the motor housing with the at least one first screw;

providing the transmission housing; and fastening the transmission housing to the bearing plate with the at least one second screw, the second screw not being in engagement with the motor housing.

11. The method as recited in claim 10 further comprising the step of fastening the transmission housing, the bearing plate and the motor housing to one another with at least one third screw.

12. The method as recited in claim 10 wherein, when fastening the bearing plate to the motor housing with the at least one first screw, or when fastening the transmission housing the bearing plate and the motor housing to one another with at least one third screw, at least one dome of the motor housing is introduced into at least one bore of the bearing plate.

13. The method as recited in claim 10 wherein the at least one first screw or at least one third screw is screwed into the motor housing in a self-tapping manner.

14. The method as recited in claim 10 wherein when fastening the transmission housing to the bearing plate with the at least one second screw, at least one dome of the bearing plate is introduced into a bore of the transmission housing.

15. The method as recited in claim 10 wherein when fastening the transmission housing to the bearing plate with the at least one second screw, the at least one second screw is screwed into a threaded bore of the bearing plate.

* * * * *